A. FRYKMAN.
PISTON RING.
APPLICATION FILED JUNE 4, 1917.
1,393,211.
Patented Oct. 11, 1921.
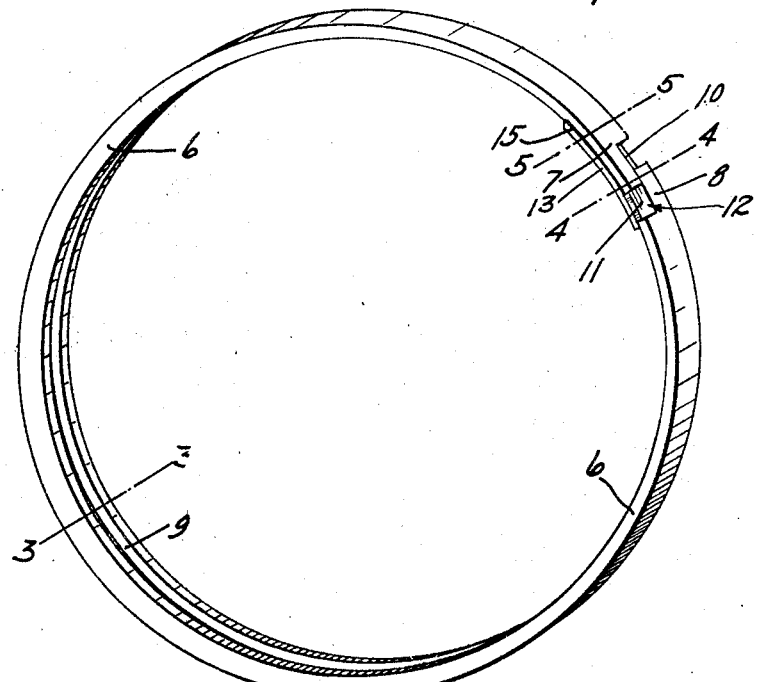
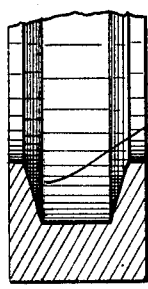
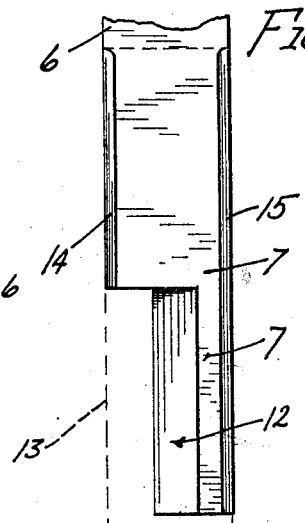
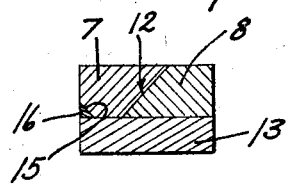
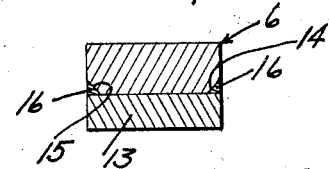
WITNESSES
E. C. Wells
A. H. Opsahl
INVENTOR
August Frykman
BY HIS ATTORNEYS
Williamson & Merchant

UNITED STATES PATENT OFFICE.

AUGUST FRYKMAN, OF SOURIS, NORTH DAKOTA, ASSIGNOR OF ONE-FOURTH TO FRANK W. GALLAND, OF MINNEAPOLIS, MINNESOTA.

PISTON-RING.

1,393,211.   Specification of Letters Patent.   Patented Oct. 11, 1921.

Application filed June 4, 1917. Serial No. 172,572.

*To all whom it may concern:*

Be it known that I, AUGUST FRYKMAN, a citizen of the United States, residing at Souris, in the county of Bottineau and State of North Dakota, have invented certain new and useful Improvements in Piston-Rings; and I do hereby declare the following to be a full, clear, and exact description of the invention, such as will enable others skilled in the art to which it appertains to make and use the same.

My invention has for its object to provide an improved piston ring and is, particularly, designed as an improvement on the piston ring disclosed and claimed in my prior Patent No. 1,206,691, of date, November 28, 1916. The present ring and that of the prior patent have laterally reduced overlapped ends and one of the ends of the ring is provided with a segmental so-called cover plate which is of sufficient length to underlap the sidewise overlapping tongues or reduced ends of the ring.

The present invention is particularly directed to an improved form of joint between the overlapping ends of the ring.

In the accompanying drawings, which illustrate the invention, like characters indicate like parts throughout the several views.

Referring to the drawings:

Figure 1 is a perspective view showing the complete piston ring;

Fig. 2 is a fragmentary plan view showing one of the ends of the ring;

Fig. 3 is a section on the line 3—3 of Fig. 1;

Fig. 4 is a section on the line 4—4 of Fig. 1; and

Fig. 5 is a section on the line 5—5 of Fig. 1.

The numeral 6 indicates the piston ring as an entirety. This ring has separable end portions 7 and 8, and at that portion that is diametrically opposite these ends, said ring has its greatest thickness, being tapered and gradually reduced in thickness in both directions toward its ends, and having an internal channel 9 in its thick portion which not only reduces the weight of the ring, but gives the same increased flexibility.

On one side of its end portion 7, the ring is provided with a rectangular rabbet 10, while the diagonally opposite side of the end portion 8 is provided with a similar rabbet 11, which rabbets respectively form overlapping tongues with parallel edges that are beveled for dovetail engagement at 12. This dovetail engagement at 12 constitutes one of the principal features of the present invention, and is highly important as will presently appear.

The segmental cover plate 13 is formed separately from the ring and it has the same width as the ring, and has such curve that it closely fits the inner surfaces of the overlapped ends of the ring. It is rigidly and permanently secured to one end of the ring by novel means, to-wit, the said end 7 at its opposite inside edges is beveled or cut away as indicated at 14 and 15. This is the preferred arrangement because the bevels 14 and 15 can start from proper points and run to the complete ends of the ring, but the bevels might be provided on the edges of the cover plate 13. Either arrangement provides grooves or recesses adapted to receive filling metal 16 which may be run thereinto by a welding process produced preferably by an oxo-acetylene welding apparatus or other apparatus for autogenous welding. By this means, the so-called cover plate is very rigidly and permanently united to the ring. In practice, it has been found that the ring may thus be constructed at comparatively small cost, whereas it is very difficult to form the ring with the cover plate as an integral part thereof.

When the ring is fitted into a groove in the piston, the overlapped ends will, of course, be held against lateral separation, and when so held, the so-called cover plate 13 and the dovetail joint 12 will positively hold the overlapped ends of the ring alined circumferentially so that one end cannot produce greater wear than the other on the cylinder surface.

What I claim is:

1. A piston ring having transversely reduced overlapped ends, and an independently formed cover plate secured to the inner surface of one of said ends and overlapping the inner surface of the other end of said ring, said cover plate being the full width of the ring, the engaging edges of said overlapped ends being beveled in a direction to undercut the end to which said cover plate is secured and to interlock the other end of said ring thereto, the ends of said ring being laterally separable only when removed from working position.

2. A piston ring having transverse reduced overlapping ends, said ends being reversely beveled at their adjacent lateral edges, a cover plate secured to the inside surface of one of said ends by fastening means which engage only said inside surface, whereby the outside surface of the ring is left free and uninterrupted, said cover plate extending under the overlapped ends, and the beveled edge of the end to which said cover plate is secured overlapping the other beveled end.

In testimony whereof I affix my signature in presence of two witnesses.

AUGUST FRYKMAN.

Witnesses:
G. W. KIRKEBY,
V. J. FRYKMAN.